UNITED STATES PATENT OFFICE.

CHARLES DREYFUS, OF CLAYTON, ENGLAND, ASSIGNOR TO THE CLAYTON ANILINE COMPANY, LIMITED, OF SAME PLACE.

RED DYE.

SPECIFICATION forming part of Letters Patent No. 441,945, dated December 2, 1890.

Application filed April 21, 1890. Serial No. 348,899. (Specimens.) Patented in England November 25, 1889, No. 18,901.

*To all whom it may concern:*

Be it known that I, CHARLES DREYFUS, chemist, a subject of the Queen of Great Britain and Ireland, and residing at Clayton, near Manchester, in the county of Lancaster, England, have invented certain Improvements in the Manufacture and Production of Coloring-Matters for Dyeing and Printing, (for which I have obtained a patent in Great Britain, No. 18,901, dated November 25, 1889,) of which the following is a specification.

Diazotized primuline, combined on the fiber with beta-naphthol, gives a coloring-matter which has been used with advantage for dyeing cotton goods. Primuline consists chiefly of two sulphonic acids, viz., dehydro-thio-paratoluidine sulphonic acid and the sulphonic acid of the so-called pure primuline base. (See Jacobsen Berl. Ber. 1889, 330; Gottermann, Berl. Ber. 1889, 422, and Green, Journal Chan. Soc., May, 1889.) Hence the combination of diazotized primuline with beta-naphthol contains two products. These products differ very much in shade, and are of different values, the dehydro-thio-paratoluidine sulphonic acid giving a coloring-matter dyeing or printing a bright red which is very valuable, whereas the sulphonic acid of the so-called pure primuline base gives a less valuable dull-bluish red. The fixed alkaline salts of these coloring-matters are not very soluble in water, but the ammonia salt is more soluble than the salts of the fixed alkalies. I employ, therefore, by preference, the ammonia salt, which can be used for dyeing animal fibers and for printing wool and cotton goods.

I give the following as an example of how my invention can be carried out in practice according to the best method with which I am acquainted, but I do not limit myself to the precise details. I dissolve one hundred parts, by weight, of sodium salt of dehydro-thio-parotoluidine sulphonic acid and twenty-one parts of nitrite of soda in three thousand parts of water and I pour this solution slowly into an agitated solution of one hundred and twenty parts of hydrochloric acid of a specific gravity of 1.17 and five hundred parts of water. The diazo compound thus formed is then poured into a solution of forty-two parts of beta-naphthol in one hundred and twenty-five parts of caustic soda of a specific gravity of 1.34 and diluted with five hundred parts of water. The combination after some hours' agitation is completed. If I wish to obtain the soda salt of the coloring-matter, I filter, press, and dry the substance; but for manufacturing the ammonia salt I add ninety parts of hydrochloric acid, (1.17 specific gravity,) which precipitates the insoluble sulpho-acid. The precipitate is filtered, washed, and pressed.

The pressed-color acid is dissolved in liquid ammonia, which may be done as follows: For one hundred parts, by weight, of the pressed paste (containing twelve per cent. of dry substance) I use five parts of liquid ammonia (of a specific gravity of 0.9 to 0.95) and I thoroughly mix the ammonia with the paste and then I dry it. The ammonia salt can also be obtained by double decomposition of salts of the color acid with suitable ammonia salts—such, for example, as the calcium salt of the color acid and the carbonate of ammonia. The coloring-matter thus obtained is a red-brown powder soluble in water with a red color and soluble also in alcohol, and dyes wool in an acid bath in shades which are fast to fulling, and dyes, also, wool which has been previously mordanted in bichromate and sulphuric acid, and can therefore be used with dye-woods. It can also be used for printing cotton goods, being applied to the goods with basic sulphate of alumina and then steamed, by which process the color is fixed to the fiber.

Having now particularly described and ascertained the nature of the said invention and in what manner the same is to be performed, I declare that what I claim is—

1. The manufacture of coloring-matter by combining diazotized dehydro-thio-paratoluidine sulphonic acid with beta-naphthol.

2. The manufacture of coloring-matter by combining diazotized dehydro-thio-paratoluidine sulphonic acid with beta-naphthol and then converting the combination into an ammonia salt.

3. As a new article of manufacture, the herein-described coloring-matter, consisting of a red-brown powder soluble in water and derived from diazotized dehydro-thio-paratoluidine sulphonic acid and beta-naphthol.

In testimony whereof I have signed my name to this specification in the presence of two subscribing witnesses.

CHARLES DREYFUS.

Witnesses:
   JAMES NUPASS,
*Clayton, Mcfr., Secretary.*
   THOMAS E. SHOWELL,
*Notary's Clerk, Manchester.*